Jan. 10, 1950 E. J. RIES ET AL 2,494,058
LIGHTING UNIT
Filed Aug. 1, 1946 5 Sheets-Sheet 1

Inventors
Edward J. Ries
Clarence G. Maxson
BY Winslow E. Rawson
their Attorney

Jan. 10, 1950 E. J. RIES ET AL 2,494,058
LIGHTING UNIT
Filed Aug. 1, 1946 5 Sheets-Sheet 2
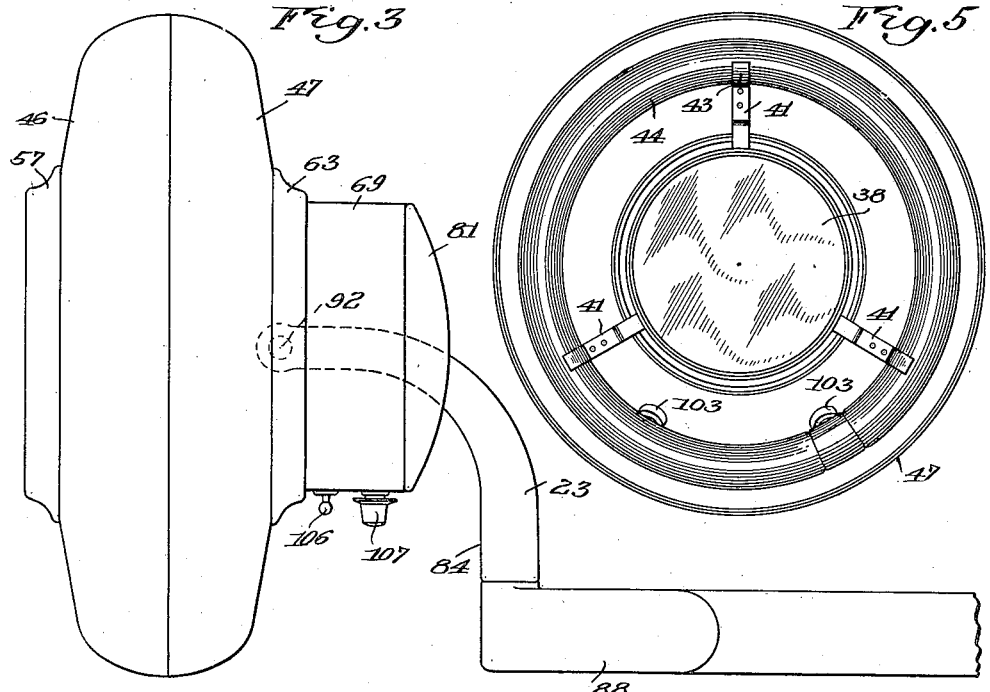
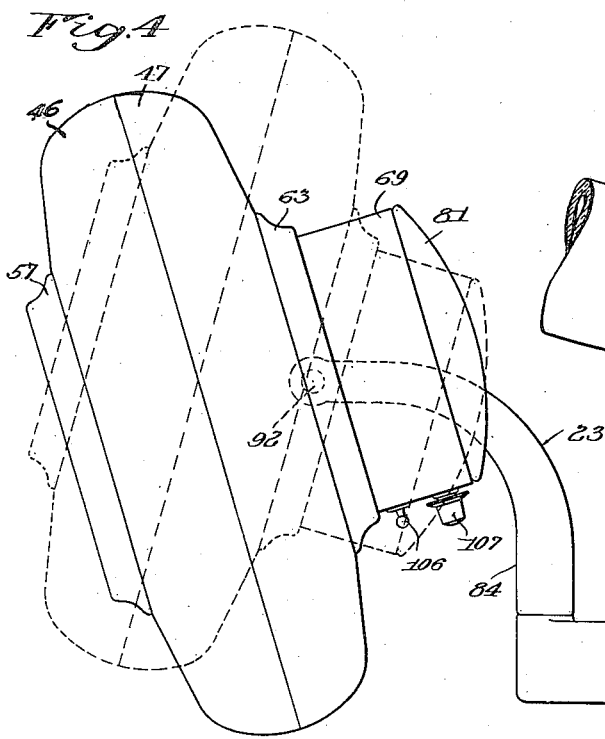
Inventors
Edward J. Ries
Clarence G. Maxson
BY
Winslow E Thurson
their Attorney Jan. 10, 1950 E. J. RIES ET AL 2,494,058
LIGHTING UNIT
Filed Aug. 1, 1946 5 Sheets-Sheet 3

Inventors
Edward J. Ries
Clarence G. Maxson
BY Winslow E. Thomas
Their Attorney

Jan. 10, 1950    E. J. RIES ET AL.    2,494,058
LIGHTING UNIT
Filed Aug. 1, 1946          5 Sheets-Sheet 4
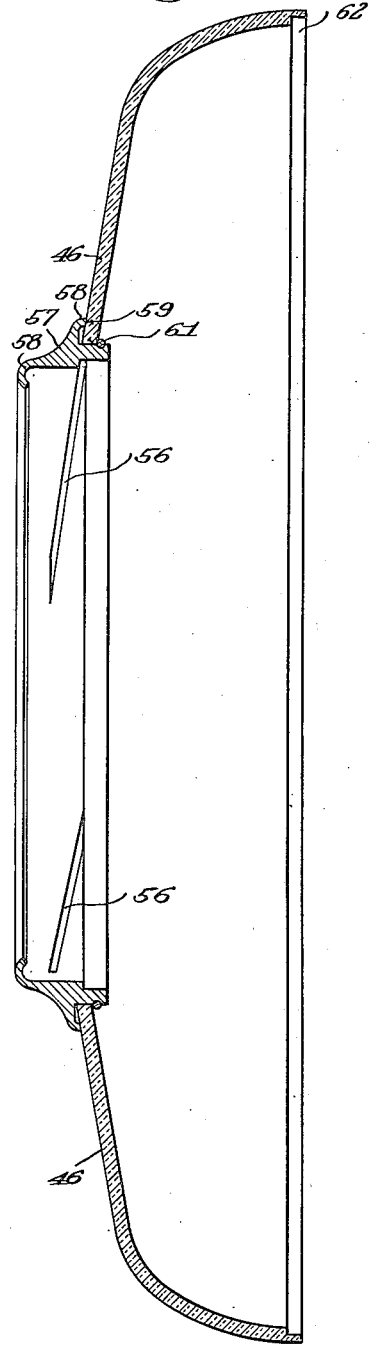
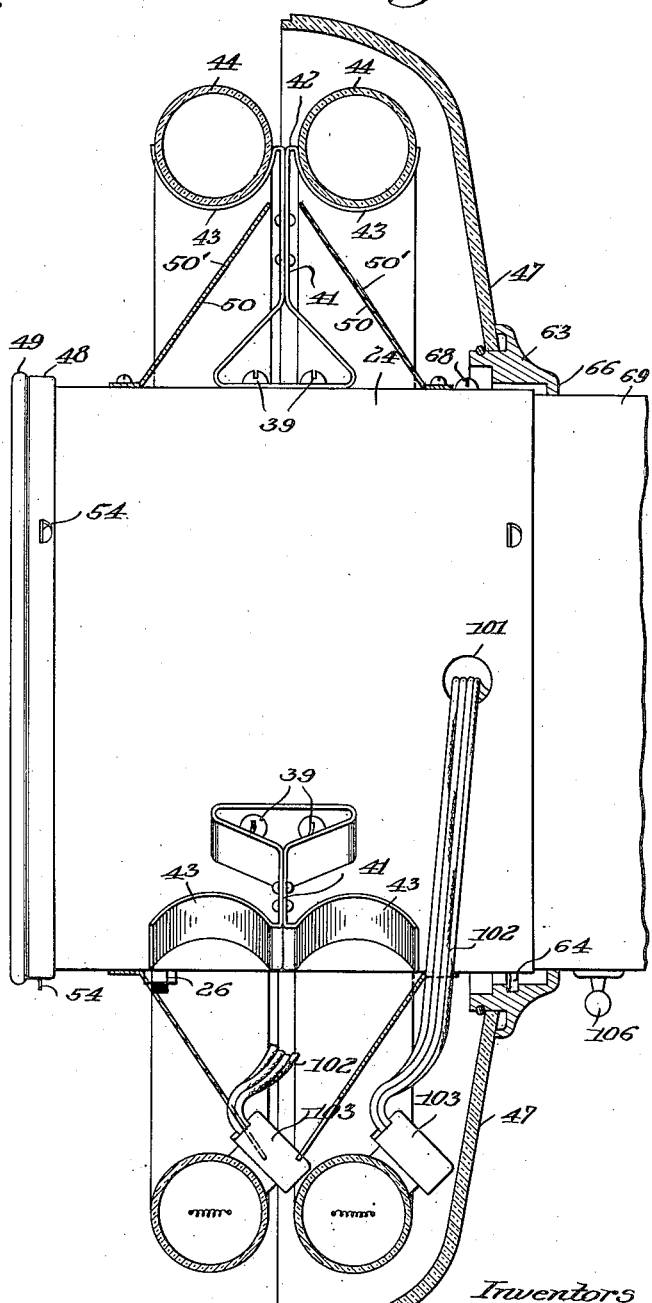
Inventors
Edward J. Ries
Clarence G. Maxson
BY their Attorney

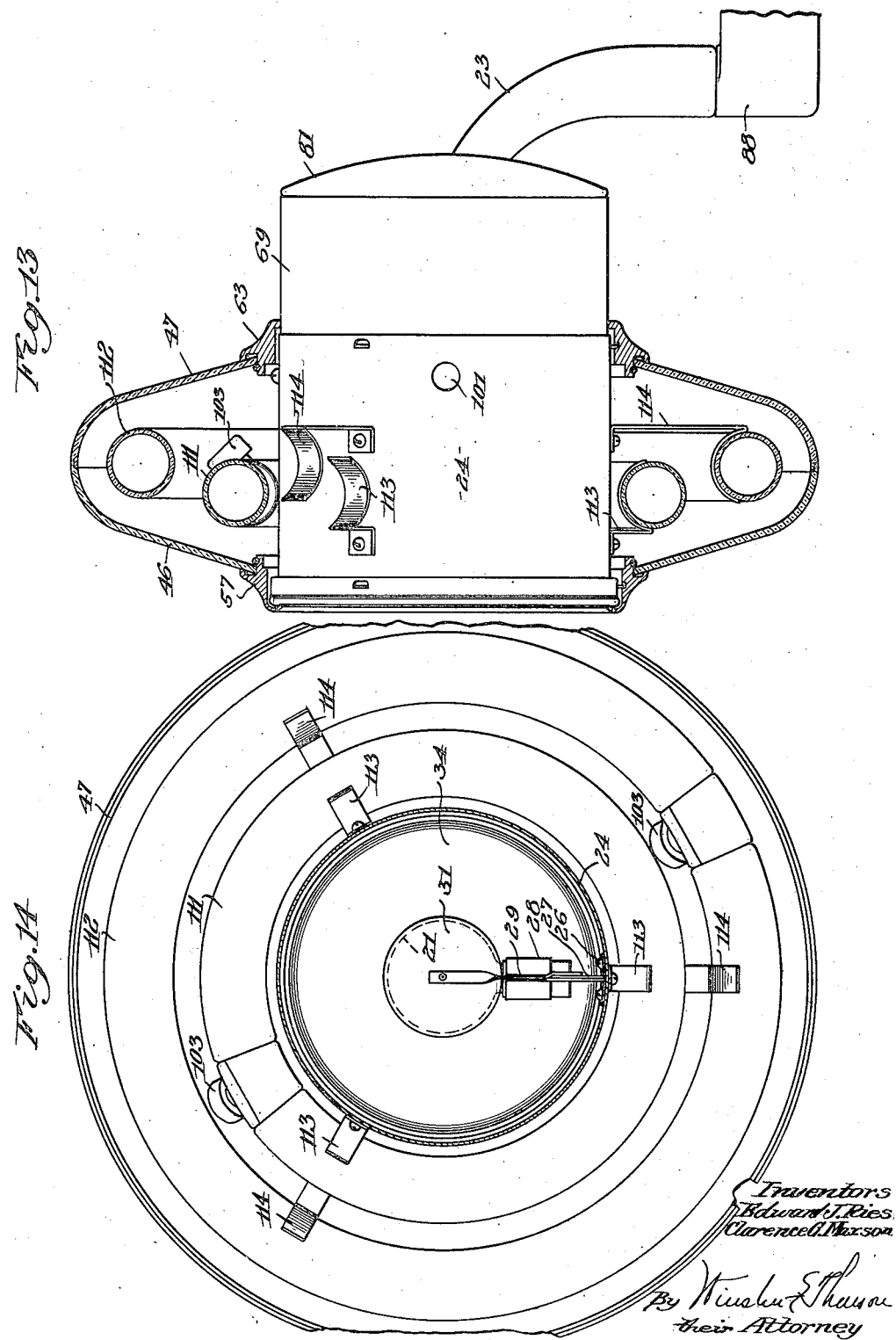

Patented Jan. 10, 1950

2,494,058

UNITED STATES PATENT OFFICE 2,494,058

LIGHTING UNIT

Edward J. Ries, Brighton, and Clarence G. Maxson, Rochester, N. Y., assignors to Ritter Company, Inc., Rochester, N. Y., a corporation of New York Application August 1, 1946, Serial No. 687,773

17 Claims. (Cl. 240—41.15)

Our invention relates to a lighting unit and more particularly, to a combined dental operating light and general dental office illumination unit.

The requirements of a dental operating light are very exacting. For intra-oral operations, it is necessary to have a concentrated powerful beam of light that can be directed and focused into the oral cavity far enough to brightly illuminate the posterior teeth and posterior areas of the mouth. This concentrated powerful beam of light should preferably be in the form of a well defined, easily controlled, intense spot of light, possibly somewhat oblong in shape, confined and directed in a manner such as to illuminate only the mouth area of the patient. The purpose of confining and easily controlling the focus of the concentrated light beam is to prevent the intense beam necessary for illuminating the posterior portions of the mouth, from shining in the eyes of the patient. The avoidance of this possibility by confining the beam and enabling convenient control of the focus is desirable for obvious reasons. A further problem encountered lies in the fact that such a concentrated beam of light would ordinarily be hot and means must be provided for eliminating this objectionable feature without detracting from the efficiency of the light for carrying out operations.

Another problem encountered in the practice of dentistry is the provision of adequate general room illumination. It is essential for the dentist to have his bracket table, dental unit, cabinet, sterilizer, and other items in the operating room which he is required to use in the practice of dentistry adequately illuminated with the proper character of light. General overhead illumination is unsatisfactory from the standpoint of providing uniform illumination of the operating area. Lack of adequate and properly located general room illumination frequently causes severe eyestrain to the dentist and/or his assistant. Moreover, when general overhead illumination is used, in conjunction with the usual type of spotlight dental operating lamp, frequently the operating bracket table which contains the usual dental hand instruments, is in semi-darkness. This inadequate lighting of the operating table results from the shadow cast thereon by the operating light which is frequently and, in fact, more conveniently positioned almost directly above the operating table.

In addition, neither the usual dental operating spot light nor the general room illumination as of a ceiling light, is suitable for the matching of synthetic enamel teeth. Such delicate shading work is best accomplished by the proper source of illumination located in the operating area adjacent the dentist. In fact, it is desirable for accuracy that the matching be done in close proximity to the light source. Continued use of poor or inadequate light for matching teeth can cause severe eyestrain.

An object of our invention is to provide an improved dental operating lamp adapted to furnish a powerful concentrated beam of light capable of being directed and focused into the posterior areas of the oral cavity and, at the same time, to provide adequate general room illumination of the proper character adapted to enable the dentist to carry on the customary functions of the practice of dentistry in an efficient manner and free from eye strain.

Another object of our invention is to provide a compact unitary dental operating lamp adapted to produce a powerful spot beam of light for operating purposes and at the same time providing daylight illumination of the room, illumination particularly suited for carrying out the delicate operations, such as matching teeth, which are required in the practice of dentistry.

A further object of our invention is to provide a dual lighting unit adapted to the carrying on of the practice of dentistry with greater ease and comfort to the dentist and the patient, the unit being suitable for operating within the oral cavity and general room illumination, the unit being further properly balanced for easy control of the focus and with the controls for the light sources within easy reach of the dentist.

Our invention further contemplates the provision of a combined or dual lighting unit, particularly suited for use by a dentist, adapted to provide a concentrated spot beam for carrying out operations within the oral cavity and at the same time adapted to provide adequate room illumination, the unit being so constructed and arranged that the concentrated beam of light may be properly shifted so as to concentrate the beam at the point desired without impairing the capabilities of the light to provide adequate and full general room illumination.

Other objects and advantages of the dual dental light of our invention will be particularly set forth in the claims, and will be apparent from the following description, when taken in connection with the accompanying drawings, in which:

Fig. 3 is an external side elevation of the lighting unit;

Fig. 4 is a view illustrating how the lighting unit may be swung on a horizontal axis;

Fig. 5 is a front view of the operating light with the cover which encloses the light sources for producing general room illumination, removed;

Fig. 6 is a view showing the plug section of one of the light sources for producing general room illumination;

Fig. 11 is a view, partly in section, showing the light sources for providing general room illumination with the front half of the cover which houses the light sources removed, and showing how the light sources are supported and current carried to them;

Fig. 12 is a sectional view showing the removable half of the cover for enclosing the general illumination light sources;

Fig. 13 is a view somewhat similar to Fig. 12, showing a modified form of our invention; and Fig. 14 is a front view of Fig. 13 with the cover for the light sources and the lens removed.

Figure 1:
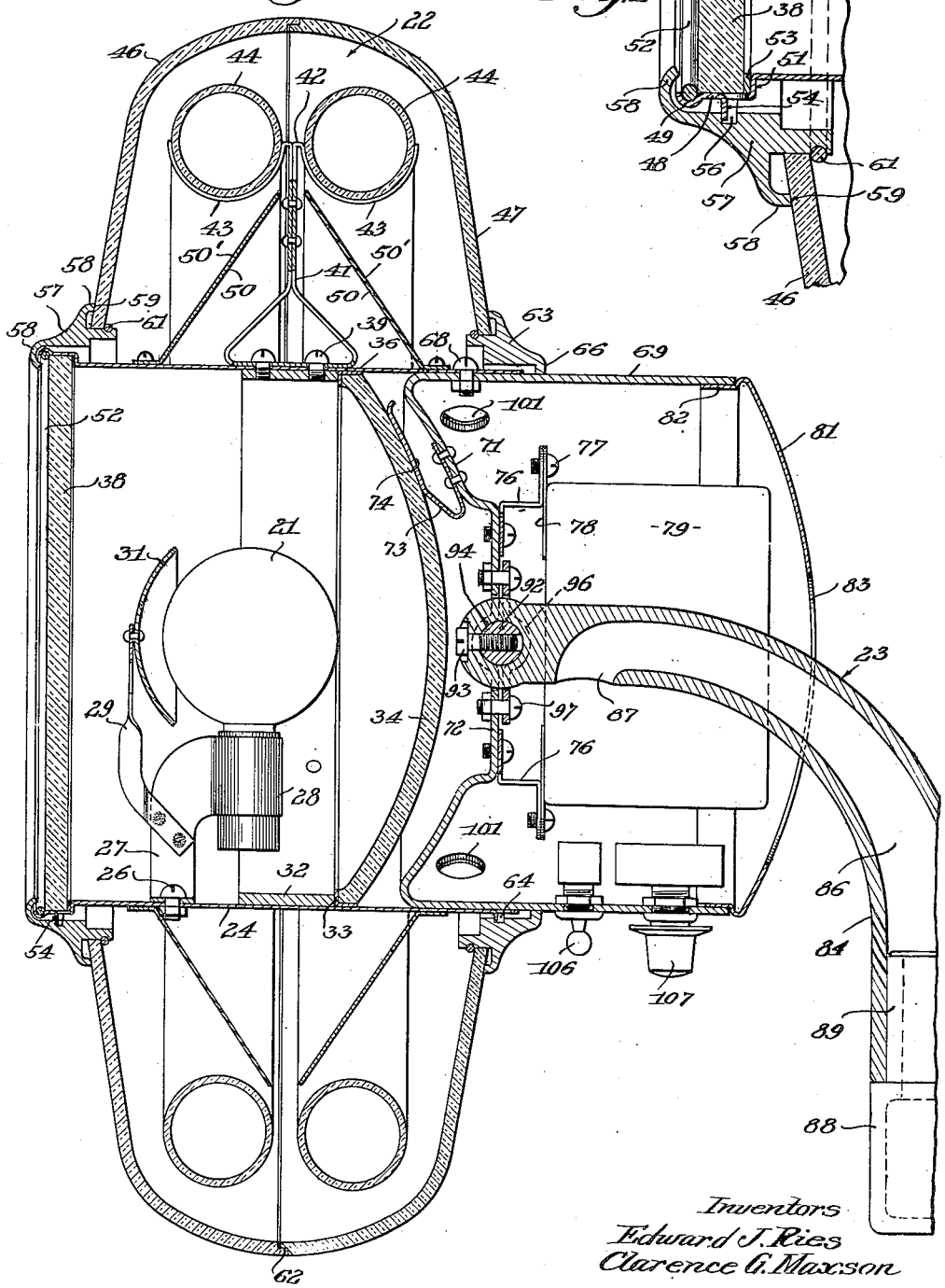
Fig. 1 is a vertical sectional view taken through the dental operating light of our invention showing the operating light, the means for concentrating and intensifying the operating beam, the light sources for providing general room illumination, and the means for enabling the lighting unit to be pivoted or swung on a vertical or horizontal axis.

As shown in Fig. 1, the combined or dual dental operating light and room illumination lighting unit of our invention comprises a light source 21 which, when properly concentrated, provides a spot of intense illumination for operating within the oral cavity; means generally indicated by the numeral 22, for providing general room illumination; and a support, generally indicated by the numeral 23, through which the lighting unit may be partially universally shifted, as will be presently described, in order to concentrate the operating beam at the point desired.

The dental operating section of the lighting unit comprises the light source 21 which may be a conventional incandescent light bulb. The operating light bulb is enclosed within a preferably substantially cylindrical casing 24. The casing has suitably secured thereto, as shown at 26, a bracket 27 which has a socket 28, connected to a suitable source of power (not shown). The light source 21 is screwed into the socket in the conventional manner. Extending from the bracket 27 is a support arm 29 which carries at the upper end thereof an opaque shield 31. The shield 31 serves to cut off the direct rays from the light source and prevents the light source from being visible to the patient when the unit is in operating position.

Carried on the internal wall of the casing is an annular ring 32 the annular edge of which provides an annular abutment 33 against which a mirror 34 is spring pressed, as presently described. The mirror 34 constitutes a reflector for the light source 21 and is preferably parabolic in shape so as to concentrate the beam of light and provide a spot of concentrated, intense illumination. Upon proper focusing by means presently described, the spot beam may be directed into the oral cavity so as to illuminate brightly, posterior portions of the mouth and the posterior teeth. Interposed between the casing and the side edges of the reflecting mirror and between the abutment and the forward edges of the mirror are gaskets 36.

Light from the light source 21, reflected and concentrated by the parabolic reflecting mirror 34, passes through a filtering lens 38 supported by the casing 24 at the front thereof. The filtering lens 38 is of a type well known in the art adapted to filter the infra-red or heat waves out of the beam of light passing therethrough. The heat absorbent glass of which the filtering lens 38 is made, is adequate to reduce the heat waves sufficiently to prevent the concentrated powerful beam from being uncomfortable to the patient.

Carried externally by the casing, as shown at 39, are preferably three brackets 41 (see Fig. 5). Each of the brackets, as shown in Fig. 1, is preferably bent of a single strip of metal. The ends of the strip are bent at 42 and curved on the arc of a circle, as shown at 43, to provide supports or seats for light sources 44 which, as shown in Fig. 1, are circular in cross-section.

The light sources 44 are of the daylight fluorescent tube type well known in the art to which this invention applies. The tubes are preferably of frosted glass and are preferably of the circular type known in the art as circline tubes. The circline tubes are held in position by the supports 43 which are preferably somewhat resilient to enable the tubes to be slipped off their supports for replacement or repair. It will be particularly observed that the circline tubes 44 are supported in concentric relation with the casing 24 and also substantially in concentric relation with the light source 21. It will further be noted that the casing separates the rays from the light sources 44 from the rays from the light source 21 thus, to a large extent, avoiding intermingling of the rays from the two types of light sources and destroying the individual desirable characteristics of each.

The circline tubes 44 are enclosed within a housing which comprises a pair of members 46 and 47. The housing members 46 and 47 may be made of either glass or plastic. Depending upon circumstances, clear, transparent glass or plastic may be used but under most conditions we prefer translucent materials. Moreover, for better lighting under some conditions the housing member 46 which is directed toward the patient, may be made of translucent glass or plastic, while the housing member 47 which is largely directed toward the ceiling may be made of transparent glass or plastic for increasing the effective room illumination. It will be observed that the two halves of the casing form substantially an ellipsoid and that the light sources are spaced a considerable distance from the casing 24 so that no parts of the room are in a shadow cast by the opaque parts of the unit.

For the purpose of further eliminating dark spots, we have found it desirable to employ a pair of cone shaped reflectors 50 extending angularly beneath the circline tubes. The reflecting surfaces 50' of these cones may be either painted white or of polished metal adapted to distribute the light more evenly over the area of the housing members 46 and 47. The cone shaped members have annular flanges adapted to be fitted over and applied to the casing 24 by screws.

Figure 2:
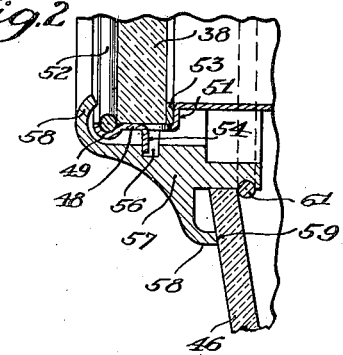
Fig. 2 is an enlarged sectional view of a portion of Fig. 1.

Upon referring to Fig. 2, it will be noted that the filtering lens 38 is supported in an annular recess 48 formed by enlarging the diameter of the casing wall. The flange forming this annular recess has a bead 49 and an annular abutting surface 51. A snap ring 52 is lodged in position in the annular depression formed internally of the bead 49 and serves to hold the filtering lens 38 against the abutment 51, a gasket 53 being interposed between the meeting surfaces.

A pair of lugs 54 are cut from the metal of the flange and are adapted to mate with helical grooves 56 provided in a retaining ring 57, the arrangement forming a bayonet catch. The retaining ring has an inturned lip 58 which engages the bead of the casing and extends over and conceals the snap ring 52. The retaining ring 57 also has an outwardly turned apron 58, the annular edge 59 of which engages the diaphanous member 46. The retaining ring 57 further has an annular groove adapted to receive a snap ring 61. The snap ring presses against the diaphanous member 46 and holds it against the apron 58. The annular meeting edges of the diaphanous members 46 and 47 are provided with mating grooves 62 adapted to form a smooth joint between the members.

It will now be apparent that the diaphanous member 46 is held in assembled relation by the retaining ring 57. When it is desired to gain access to the fluorescent circline tubes 44, the retaining ring 57 is rotated to release the bayonet catch provided by lugs 54 and helical slots 56. The retaining ring 57 and the diaphanous member 46 may then be removed as a unit without disturbing the filtering lens 38. However, when desired, the snap ring 52 may also be removed to thereby enable removal of the filtering lens 38 to gain access to the light source 21 for the purpose of replacement.

The diaphanous member 47 is similarly held in position by a retaining ring 63. The retaining ring 63 is similarly held with respect to the casing by a bayonet catch, as indicated at 64, and the downturned annular edge 66 thereof rests against the wall of a casing 69 which in effect is a continuation of the casing 24.

Figure 10:
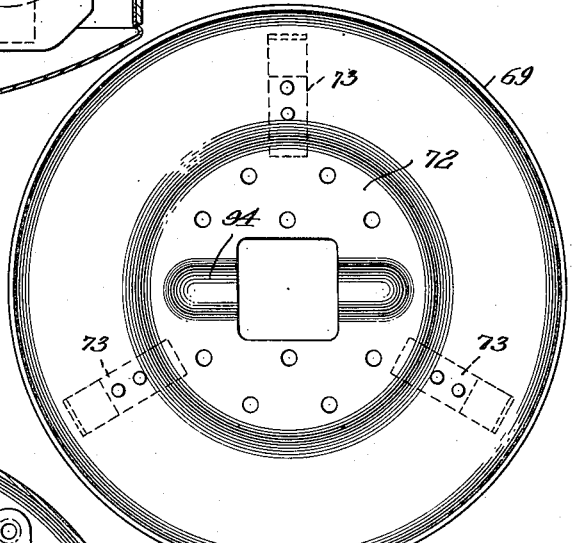
Fig. 10 is a view showing the forward wall of the casing for housing the reactors.

The cylindrical casing 24 is connected to the casing 69 by nut and bolt assemblies 68. The two casings 24 and 69 form a unitary enclosure for housing most of the elements of the lighting unit. The casing 69 has an inwardly turned forward wall 71 which has a support part 72, the major part of which is planular. The outer surface of the forward wall 71 has a plurality of return bent spring clips 73 (see Fig. 10) secured thereto in any suitable manner. The clips are provided with bearing surfaces 74 adapted to engage the light reflecting and concentrating mirror 34 and resiliently hold it in position against the gasket 36 and the annular abutment 33.

Figure 8:
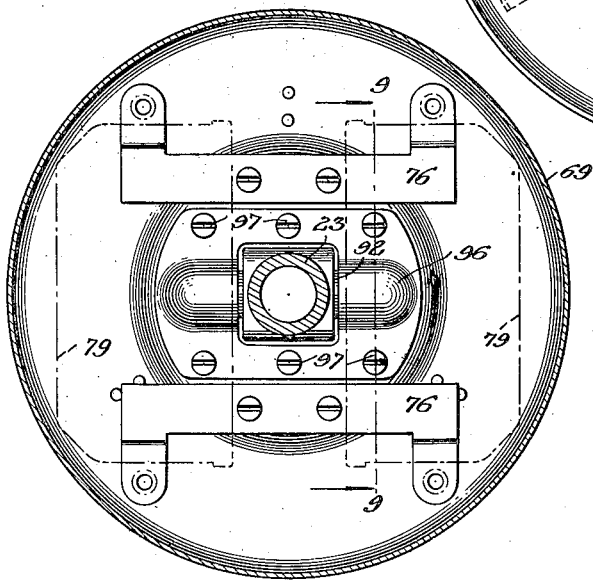
Fig. 8 is a sectional view taken substantially on the line 8—8 of Fig. 7 in the direction indicated by the arrows.

Secured by screws to the rear wall of the support part 72 is a pair of brackets 76 which extend across the support part, as shown most clearly in Fig. 8. The brackets have secured thereto by means of screws 77, arms 78 to which are secured in any suitable manner as by spot welding, a pair of reactors or transformers 79. A reactor 79 is provided for each of the circline fluorescent tubes, the purpose of which is well known in the art to which this invention applies.

The open end of the cylindrical wall forming the casing 69 is closed by a cap 81 which has an annular flange 82 adapted to telescope within the casing wall 69. The cap 81 has an elongated slot 83 through which a preferably goose-neck support post 84 extends. The support post is hollow, as shown at 86, and opens into the casing 69, as shown at 87.

The support post 84 is carried by an arm 88, shown most clearly in Figs. 3 and 4. Extending upwardly from the arm 88 is a pivot rod 89 over which the end of the support post 84 is telescoped, as shown in Fig. 1. The arm 88 and the pivot rod 89 have openings through which leads for carrying current to the light sources extend. The leads extend upwardly through the hollow support post 84 and out through the opening 87 into the casing 69. The wiring has been omitted from the drawings except to show, as in Fig. 11, how the wires are carried from the casing 24—69 to the circline fluorescent tubes.

Figure 7:
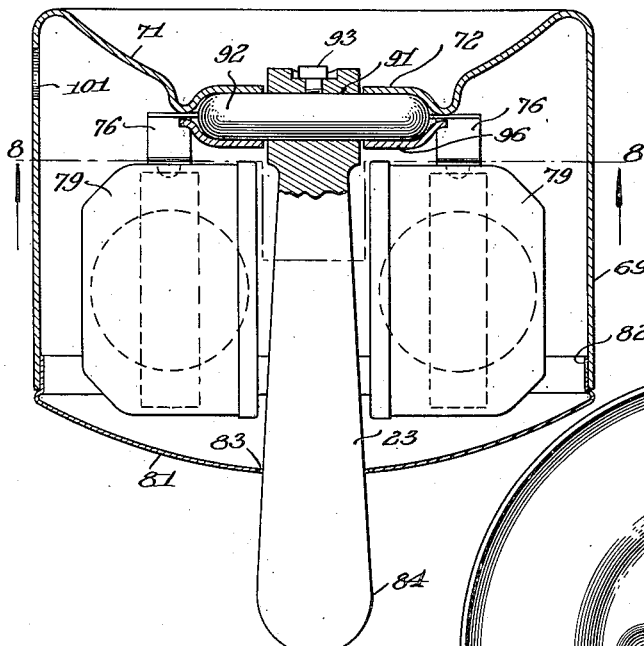
Fig. 7 is a sectional view through a portion of the casing showing the location of the reactors or transformers and the support arm for the lighting unit.

The support post 84 extends through the elongated slot 83 forwardly in the lighting unit to a position between the reactors 79 and forwardly thereof. At its forward end, as shown most clearly in Fig. 7, the support post has a bore 91 for the reception of a pivot pin 92. The support post is connected rigidly to the pivot pin 92 by means of a screw 93, shown most clearly in Fig. 1.

Figure 9:
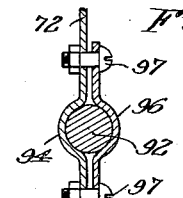
Fig. 9 is a sectional view taken substantially on the line 9—9 of Fig. 8 in the direction indicated by the arrows.

The support part 72 (Fig. 1) has a semi-cylindrical recess 94 which matches with a semi-cylindrical recess formed in a clamping member 96. The arrangement of parts is shown most clearly in Fig. 9, the clamping part 96 being connected to the support part by means of nut and bolt assemblies 97. The pivot rod 92 is clamped sufficiently rigidly to hold the lamp in a desired adjusted position. However, when the dentist desires to focus the operating beam on the mouth of the patient, upon grasping the unit, he may adjust it on a horizontal axis defined by the pivot pin 92 in the manner illustrated in Fig. 4. At the same time, the support post 84 is adjustably rotatable about a vertical axis by rotating the support post 84 on the pivot rod 89. It will thus be apparent that the light unit is substantially universally adjustable within the limits required for carrying out its function and enabling proper focus of the spot beam.

It will now be apparent that the lighting unit is pivoted approximately at its center of weight. The support post 84 extends between the transformers so that the weight is evenly distributed on opposite sides of a vertical central plane through the unit. Moreover, the support post extends forwardly of the transformers which are heavy in weight so that the pivot rod 92 is approximately at the horizontal center of weight of the unit. Thus, the unit is substantially balanced in any adjusted position so that it will remain as adjusted with a slight clamping friction between the pivot parts. The clamping action may be readily adjusted by tightening the nut and bolt assemblies 97.

As previously mentioned, the wires for the lighting unit extend through the hollow support post and through the opening 87 into the interior of the casing 69. Openings 101 are provided in the casing 69 which are in registry with openings in the casing 24 through which the wires are extended, as illustrated in Fig. 11, to the circline fluorescent tubes, as shown at 102. Each of the tubes requires four wires which are connected into a plug 103 having terminal openings adapted to be received over the terminal pins 104 of the circline tubes, as shown in Fig. 6.

The lighting unit is provided with two switches at a convenient location for operation by the dentist without moving from his normal work place. A switch 106 is provided for the incandescent lamp 21, while a switch 107 controls the flow of current to the fluorescent tubes. With separate controls 106 and 107 respectively for the operating light 21 and the fluorescent tubes, the dentist may employ each separately or both together. Thus, the operating light 21 may be switched off, except for periods when actual operations are being performed. Similarly at some periods of the day, some dental offices may not require general room illumination or the dentist may in some cases on delicate operations prefer to work without general room illumination. In such cases the fluorescent tubes may be cut out.

In Figs. 13 and 14, we have shown a modified form of our invention which is the same in all respects as the preferred form of the invention, previously described, except that two daylight type fluorescent circline tubes are employed of different diameters. These tubes 111 and 112 are carried in semi-circular support brackets 113 and 114 suitably secured to the casing 24. Both fluorescent tubes are preferably arranged substantially concentric with the casing 24 and with the operating light 21. The tubes are somewhat nested with respect to each other which enables a reduction in the width of the housing formed by the diaphanous members 46 and 47 from that shown in the preferred form of the invention.

It will now be appreciated that we have provided a combined lighting unit adapted to provide the dentist with an operating light which throws a powerful spot beam of light which may be conveniently focused on the oral cavity so as to illuminate posterior teeth and posterior areas of the mouth. At the same time, the patient's eyes are protected against direct rays from the light source and excessive heat conditions are avoided.

It will also be apparent that we have provided, in the same unit, daylight fluorescent light sources which properly illuminate the operating area and are effective to provide such daylight illumination regardless of how the operating beam may be focused; that is, adjustment of the operating beam does not adversely affect the general room illumination nor the effective illumination of the operating area.

It will further be evident, notwithstanding the necessity of providing the relatively heavy transformers required for fluorescent tube operation, that the unit is substantially balanced on its pivot at substantially its center of weight so that it may easily be adjusted for proper focusing.

A further fact of importance is that the controls for both light sources are located in the operating area within easy reach of the dentist and that the dentist may carry on such delicate operations as matching teeth or matching synthetic enamel to teeth without changing his position in the operating area, and under the ideal conditions of daylight fluorescent illumination.

While we have shown and described the preferred forms of our invention, it will be apparent that various changes and modifications may be made therein, particularly in the form and relation of parts without departing from the spirit of our invention, as set forth in the appended claims.

We claim:

1. A dental illumination unit for the purposes described comprising, in combination, a casing, a light source mounted in said casing, a parabolic reflector mounted in said casing and arranged to concentrate the light in such manner as to provide a spot of light adapted to illuminate the oral cavity, a heat ray filtering lens carried by the casing through which the reflected rays from said light source are projected, a shield between said lens and said light source for protecting the eyes of the patient against glare, and a second light source for general diffused room illumination supported by said casing externally thereof with the casing walls separating said light sources.

2. A dental illumination unit for the purposes described comprising, in combination, a casing, a light source mounted in said casing, a reflector mounted in said casing and arranged to concentrate the light in such manner as to provide a spot of light adapted to illuminate the oral cavity, a heat ray filtering lens carried by the casing through which the reflected rays from said light source are projected, an opaque shield between said lens and said light source for obstructing the direct rays from said light source, a second light source for general diffused room illumination supported by said casing externally thereof with the casing walls separating said light sources, and a diaphanous housing supported from said casing and enclosing said second light source.

3. A dental illumination unit for the purposes described comprising, in combination, a casing, a light source mounted in said casing, a reflector mounted in said casing and arranged to concentrate the light in such manner as to provide a spot of light adapted to illuminate the oral cavity, a heat ray filtering lens carried by the casing through which the reflected rays from said light source are projected, an opaque shield between said lens and said light source for preventing the patient from viewing the light source, a second light source for general diffused room illumination supported by said casing externally thereof with the casing walls separating said light sources, said second light source being in the form of an annulus extending in substantially concentric relation with said casing and said first light source, and a diaphanous housing supported from said casing and enclosing said second light source.

4. A dental illumination unit for the purposes described comprising, in combination, a casing, a light source mounted in said casing, a reflector mounted in said casing and arranged to concentrate the light in such manner as to provide a spot of light adapted to illuminate the oral cavity, a heat ray filtering lens carried by the casing through which the reflected rays from said light source are projected, an opaque shield between said lens and said light source for preventing the patient from viewing the light source, a second light source for general diffused room illumination supported by said casing externally thereof with the casing walls separating said light sources, said second light source being in the form of an annulus extending in substantially concentric relation with said casing and said first light source, a diaphanous housing supported from said casing and enclosing said second light source, and means for pivotally supporting said casing to enable the focusing of said spot of light on the oral cavity.

5. A dental illumination unit for the purposes described comprising, in combination, a casing, a light source mounted in said casing, a reflector mounted in said casing and arranged to concentrate the light in such manner as to provide a spot of light adapted to illuminate the oral cavity, a heat ray filtering lens carried by the casing through which the reflected rays from said light source are projected, an opaque shield between said lens and said light source, a second light source for general diffused room illumination supported by said casing externally thereof with the casing walls separating said light sources, said second light source being in the form of an annulus extending in substantially concentric relation with said casing and said first light source, and separate control switches carried by said casing for controlling each of said light sources separately.

6. A dental illumination unit for the purposes described comprising, in combination, a casing, a light source mounted in said casing, a reflector mounted in said casing adapted to concentrate the rays of light from said light source to provide a spot of intense illumination for the oral cavity, an annular light source supported by said casing externally thereof and in surrounding relation to said casing, a diaphanous housing for enclosing said annular light source, a support for said casing extending through the rear wall thereof with respect to which said casing is pivoted, said support having electrical connections for the light sources extending therethrough into the casing and said casing having an opening through which said connections extend into the housing for connection to said annular light source.

7. A dental illumination unit for the purposes described comprising, in combination, a casing, a light source mounted in said casing, means in said casing for concentrating a spot beam of reflected light from said light source on the oral cavity, a plurality of annular fluorescent light sources mounted externally of the casing in surrounding relation thereto, a diaphanous housing enclosing said fluorescent light sources, transformers for each of said fluorescent light sources mounted in said casing toward the rear thereof, a support for said unit extending through the rear wall of the casing and extending between the transformers to a position well forwardly of the rear wall, and means for pivoting the casing and the support with respect to each other at a point forwardly of said transformers.

8. A dental illumination unit for the purposes described comprising, in combination, a casing, a light source mounted in said casing, a light concentrating reflector mounted in said casing for concentrating a spot beam of reflected light on the oral cavity, a plurality of annular fluorescent light sources mounted externally of the casing in surrounding relation thereto, a diaphanous housing enclosing said fluorescent light sources, transformers for each of said fluorescent light sources mounted in said casing rearwardly of the reflector, a support for said unit extending through the rear wall of the casing between the transformers to a position just rearwardly of the reflector, and means on the end of the support for pivoting the casing and the support with respect to each other.

9. A dental illumination unit for the purposes described comprising, in combination, a casing, a light source mounted in and substantially enclosed by said casing, means within said casing for concentrating the rays from said light source in a manner such as to illuminate the oral cavity and protect the eyes of the patient from glare, a second light source for general diffused room illumination shaped in the form of an annulus and extending around said casing, an enclosing housing for said second light source, and means for releasably supporting said housing by and from said casing.

10. A dental illumination unit for the purpose described comprising, in combination, a casing, a light source mounted in and substantially enclosed by said casing, a light concentrating reflector mounted in and supported by said casing, a lens carried by the casing through which the reflected rays from said light source are projected to provide a concentrated beam of light adapted to illuminate the oral cavity, a shield between said lens and said light source for protecting the eyes of the patient against glare, a second light source for general diffused room illumination supported by and from said casing externally thereof with the casing walls separating said light sources, an enclosing housing for said second light source, and means for releasably supporting said housing by and from said casing.

11. A dental illumination unit for the purposes described comprising, in combination, a casing having a rear opening, a light source mounted in said casing, an annular fluorescent light source mounted externally of the casing in surrounding relation thereto, a diaphanous housing enclosing said fluorescent light source, a transformer for said fluorescent light source mounted in said casing rearwardly of the first light source, a support for said unit extending through the rear opening to a position in the casing forwardly of the transformer, and means for pivoting the casing on the support.

12. A dental illumination unit for the purposes described comprising, in combination, a casing having a rear opening, a light source mounted in said casing, an annular fluorescent light source mounted externally of the casing in surrounding relation thereto, a diaphanous housing enclosing said fluorescent light source, a transformer for said fluorescent light source mounted in said casing rearwardly of the first light source, a support for said unit extending through the rear opening to a position in the casing forwardly of the transformer, a vertically extending member, and means for mounting the support for swinging movement on said member.

13. A dental illumination unit for the purposes described comprising, in combination, a casing having a rear opening, a light source mounted in said casing, an annular fluorescent light source mounted externally of the casing in surrounding relation thereto, a diaphanous housing enclosing said fluorescent light source, a transformer for said fluorescent light source mounted in said casing rearwardly of the first light source, a support for said unit extending through the rear opening to a position in the casing forwardly of the transformer, a vertically extending member, and means for mounting the support for swinging movement on said member, said support being hollow through which electrical leads extend into the casing and from thence to the light sources.

14. A dental illumination unit for the purposes described comprising, in combination, a casing having a rear opening, a light source mounted in said casing, means in said casing for concentrating the light from said light source to illuminate the oral cavity, an annular fluorescent light source mounted externally of the casing in surrounding relation thereto for general room illumination, a diaphanous housing enclosing said fluorescent light source, a transformer for said fluorescent light source mounted in said casing rearwardly of the first light source, a support for said unit extending through the rear opening to a position in the casing forwardly of the transformer, means for pivoting the casing on the support, a vertically extending member, and means for mounting the support for swinging movement on said member.

15. A dental illumination unit for the purposes described comprising, in combination, a casing having a rear opening, a light source mounted in said casing, means in said casing for concentrating the light from said light source to illuminate the oral cavity, an annular fluorescent light source mounted externally of the casing in surrounding relation thereto for general room illumination, a diaphanous housing enclosing said fluorescent light source, a transformer for said fluorescent light source mounted in said casing rearwardly of the first light source, a support for said unit extending through the rear opening to a position in the casing forwardly of the transformer, means for pivoting the casing on the support, a vertically extending member, and means for mounting the support for swinging movement on said member, said support being hollow through which electrical leads extend into the casing and from thence to the light sources.

16. A dental illumination unit for the purposes described comprising, in combination, a casing, a light source mounted in and substantially enclosed by said casing, means within said casing for concentrating the rays from said light source in a manner such as to illuminate the oral cavity and protect the eyes of the patient from glare, a second light source for general diffused room illumination shaped in the form of an annulus and extending around said casing, an enclosing housing for said second light source and reflecting means between said casing and said second light source.

17. A dental illumination unit for the purposes described comprising, in combination, a casing, a light source mounted in and substantially enclosed by said casing, means within said casing for concentrating the rays from said light source in a manner such as to illuminate the oral cavity and protect the eyes of the patient from glare, a second light source for general diffused room illumination shaped in the form of an annulus and extending around said casing, an enclosing housing for said second light source, reflecting means between said casing and said second light source supported by said casing, and means for releasably supporting said housing by and from said casing.

EDWARD J. RIES.
CLARENCE G. MAXSON.

REFERENCES CITED

The following references are of record in the file of this patent:

UNITED STATES PATENTS

| Number | Name | Date |
| --- | --- | --- |
| 1,263,234 | Hanson | Apr. 16, 1918 |
| 1,804,566 | Mullaney | May 12, 1931 |
| 2,041,189 | Keating et al. | May 19, 1936 |

FOREIGN PATENTS

| Number | Country | Date |
| --- | --- | --- |
| 376,436 | Italy | Nov. 15, 1939 |